(12) United States Patent
Takahama et al.

(10) Patent No.: US 12,333,675 B2
(45) Date of Patent: Jun. 17, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Atsushi Takahama, Kanagawa (JP); Toru Kokura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 17/694,483

(22) Filed: Mar. 14, 2022

(65) Prior Publication Data
US 2022/0309612 A1    Sep. 29, 2022

(30) Foreign Application Priority Data
Mar. 26, 2021    (JP) .................... 2021-053212

(51) Int. Cl.
*G06T 3/4046* (2024.01)
*G06N 3/08* (2023.01)
(Continued)

(52) U.S. Cl.
CPC ............. *G06T 3/4046* (2013.01); *G06N 3/08* (2013.01); *G06T 3/4015* (2013.01); *G06T 3/4038* (2013.01); *G06T 7/0002* (2013.01); *G06T 2207/20081* (2013.01); *G06T 2207/20084* (2013.01); *G06T 2207/30168* (2013.01)

(58) Field of Classification Search
CPC .......... G06N 3/08; G06N 3/045; G06N 3/084; G06N 3/04; G06N 3/044; G06N 3/0464; G06N 3/047; G06N 3/082; G06N 3/09; G06T 2207/20081; G06T 2207/20084; G06T 3/4046; G06T 3/4015; G06T 2207/10024; G06T 2207/20024; G06T 2207/20208; G06T 2207/30168; G06T 3/4038; G06T 3/4053; G06T 3/4076; G06T 5/60; G06T 5/70; G06T 7/00; G06T 7/0002
See application file for complete search history.

(56) References Cited

U.S. PATENT DOCUMENTS 10,664,722 B1 *  5/2020  Sharma .................. G06F 18/22
2018/0075581 A1 * 3/2018  Shi ......................... G06N 3/045
(Continued)

OTHER PUBLICATIONS

Michaël Gharbi, et al., Deep Joint Demosaicking and Denoising, Siggraph Asia 2016, ACM Transactions on Graphics (TOG), Nov. 2016.

*Primary Examiner* — Margaret G Webb
(74) *Attorney, Agent, or Firm* — Canon U.S.A., Inc. IP Division

(57) ABSTRACT

An image processing apparatus includes an acquisition unit configured to acquire training image data, an extraction unit configured to learn the training image data and extract first difficult image data that is difficult to learn from a result of the learning, a generation unit configured to generate student image data by mosaicking the first difficult image data, and a training unit configured to generate a network parameter obtained by re-learning a pair of the first difficult image data and the student image data. The training unit repeats the re-learning by generating a plurality of times second difficult image data different from the first difficult image data.

15 Claims, 9 Drawing Sheets

(51) Int. Cl.
*G06T 3/4015* (2024.01)
*G06T 3/4038* (2024.01)
*G06T 7/00* (2017.01)

(56) References Cited

U.S. PATENT DOCUMENTS

2021/0342631 A1* 11/2021 Takahashi ........... G06F 18/2411
2022/0164926 A1* 5/2022 Kurmanov ................ G06T 5/70

* cited by examiner

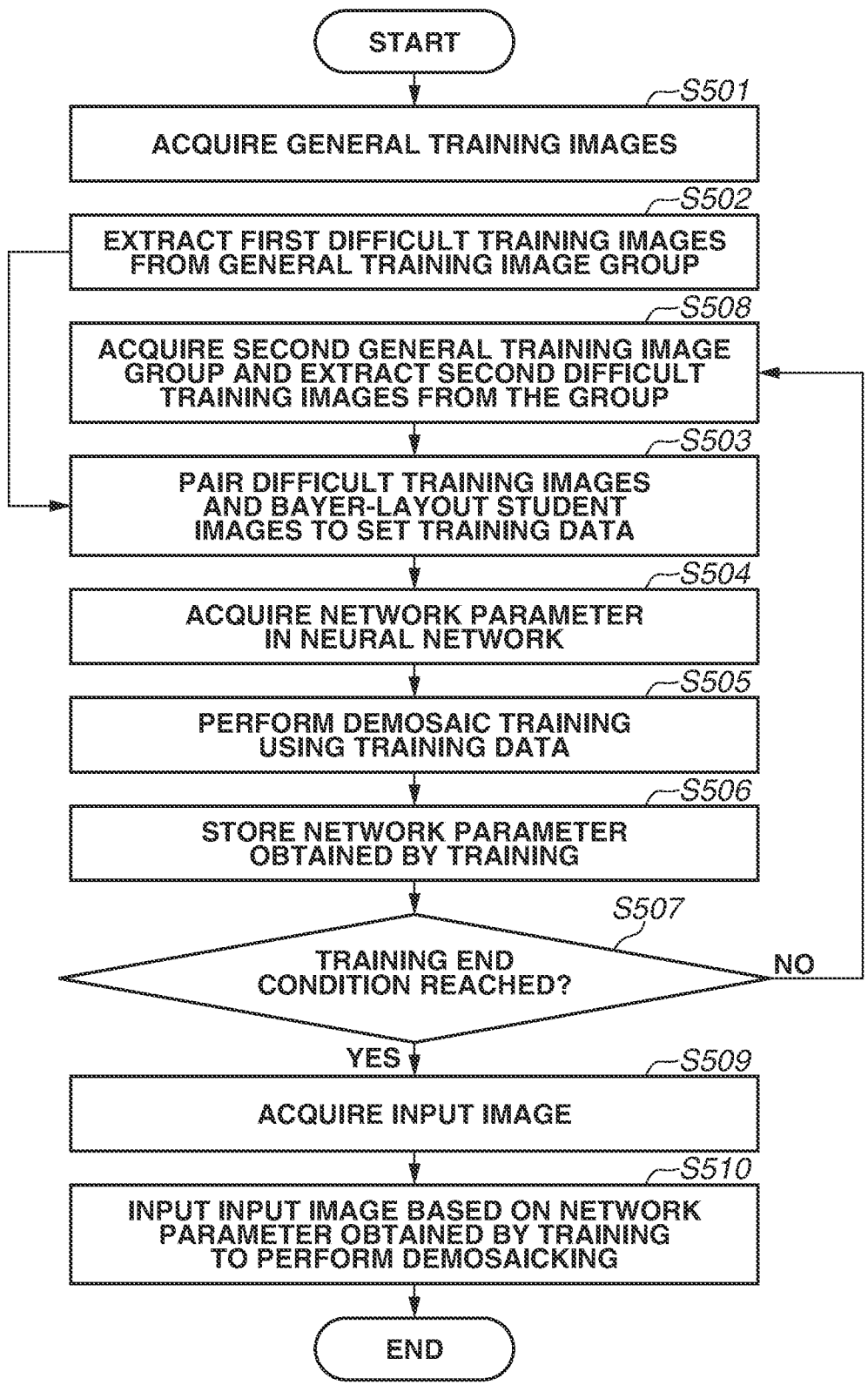

IMAGE PROCESSING APPARATUS, IMAGE PROCESSING METHOD, AND STORAGE MEDIUM

BACKGROUND

Field of the Disclosure

The present disclosure relates to an image processing technique with machine learning.

Description of the Related Art

The Bayer-layout captured image is a mosaic image in which a pixel value corresponding to a red, green, or blue (RGB) color is set to each pixel in an imaging element. The development processing unit of a camera performs various types of signal processing such as demosaic processing for interpolating the pixel values of the remaining two colors in the mosaic image, and generates and outputs a color image.

A non-patent document, "M. Gharbi, G. Chaurasia, S. Paris, and F. Durand, in 'Deep Joint Demosaicking and Denoising', Siggraph Asia 2016, ACM Transactions on Graphics (TOG), November 2016," discusses a method of training a convolutional neural network (CNN)-based demosaic network. The method involves acquirement of a group of a large number of RGB images (general training images) as images for training first.

Then, images difficult to demosaic (difficult training images) are extracted from the general training images and are used to train the CNN. Upon completion of the training, a trained model is used to input mosaic images to the CNN and perform inference (task of regression on the input data) to convert the mosaic images into RGB images.

In the above-described technique, some image quality defects such as moire and false color appear in the demosaicked images in insufficiently trained areas due to an method of extracting difficult training images.

SUMMARY

According to an aspect of the present disclosure, an image processing apparatus includes an acquisition unit configured to acquire training image data, an extraction unit configured to learn the training image data and extract first difficult image data that is difficult to learn from a result of the learning, a generation unit configured to generate student image data by mosaicking the first difficult image data, and a training unit configured to generate a network parameter obtained by re-learning a pair of the first difficult image data and the student image data. The training unit repeats the re-learning by generating a plurality of times second difficult image data different from the first difficult image data.

Further features of the present disclosure will become apparent from the following description of exemplary embodiments with reference to the attached drawings.

BRIEF DESCRIPTION OF THE DRAWINGS

FIG. 5 is a flowchart illustrating image conversion processing according to one or more aspect of the present disclosure.

DESCRIPTION OF THE EMBODIMENTS

Some exemplary embodiments will be described below with reference to the drawings. The following exemplary embodiments are not intended to limit the present disclosure defined in the claims, and not all of the combinations of features described in the exemplary embodiments are not used in the solution of the present disclosure. Like numbers refer to like components, and duplicated descriptions thereof will be omitted. In the following description, image data representing an image may also be simply called an image.

In a first exemplary embodiment, an example will be described in which training is first performed with a first difficult training image group, and then a second difficult training image group is extracted and re-retraining is performed with the second difficult training image group. Specifically, after the training with the first difficult twining image group, which areas are insufficiently trained is determined, and the second training image group is generated from the images of those areas.

The following is a description of what causes image quality defects in the conventional technique, and a description of the approach to a countermeasure against the defects. Subsequently, the configuration of an image processing apparatus in the present exemplary embodiment, a convolutional neural network (CNN), and then a detailed configuration example of the image processing apparatus will be described.

What Causes Image Quality Defects and Approach to Countermeasure

Figure 9A:
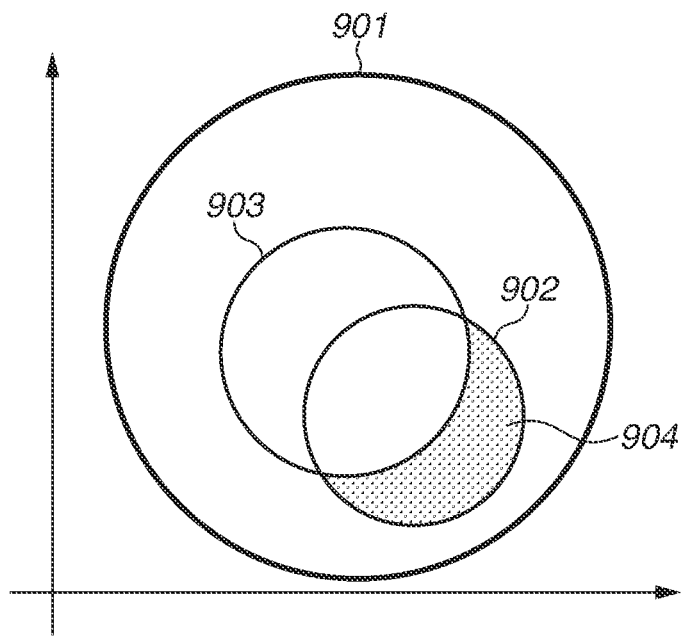
FIGS. 9A and 9B are diagrams for describing image quality defects.

What causes image quality defects will be described with reference to FIG. 9A. In an image feature space, a general training image 901 is present, and an image 902 that is likely to have image quality defects is in the general training image 901. Examples of images likely to have image quality defects in demosaicking include images with many high-frequency components, images containing a large number of saturated pixels, and images of complementary colors adjacent to each other. These images are difficult to demosaic due to characteristics of color filter layouts, and are likely to have image quality defects such as moire and false colors at the time of inference.

There exist a small number of images with difficulty in demosaicking, causing insufficient training in many cases. Thus, extracting difficult training images with difficulty in demosaicking alone from a general training image group and then training performed with the extracted data set allows intensive training with high-efficiency training images.

However, all types of images with difficulty in demosaicking are not always included in a created set of difficult training image data described above (hereinafter, also called difficult image data). For example, if a very small number of images with complementary colors adjacent to each other is present in a general training image group as the population for extraction, this means that few difficult images are included in the difficult training image group, which leads to insufficient training in the corresponding areas. As a result, inputting the images with complementary colors adjacent to each other at the time of inference can result in occurrence of image quality defects.

In addition, it is hard to prepare optimum indices for extracting difficult training images, and false detection or failure to detect can occur in extraction. As a result, such a difficult training image group as a difficult training image group 903 is extracted (that means that some difficult training images exist outside the group 903, but most of the difficult training images are included in the group 903). That causes an insufficiently trained area 904 with increased image quality defects.

In contrast to this, in the present exemplary embodiment, test images are used to perform an inspection with on whether there exists any insufficiently trained area, after training. If any, an index of extraction is updated so that more insufficient areas are more likely to be determined as difficult images, and then a second difficult training image group is extracted. Performing re-training with the extracted second difficult training image group makes it possible to intensively train the insufficiently trained areas, thereby achieving reduction in image quality defects at the time of inference. The processing of extraction and re-training is repeated until a predetermined training end condition is reached. New data is added to the general training image group every repetition for its expansion, thereby increasing variations of extracted difficult training images.

Configuration of Image Processing Apparatus

Figure 1:
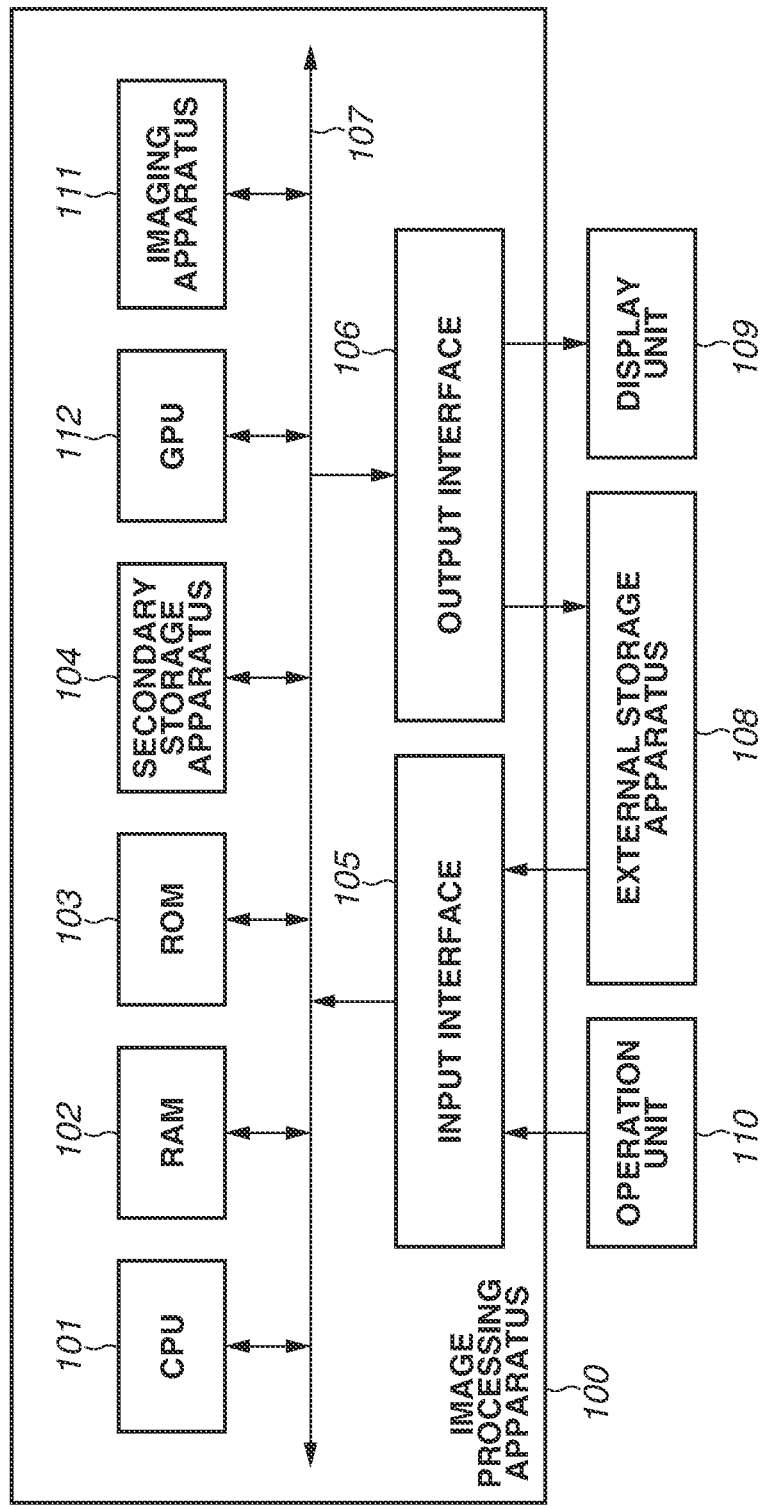
FIG. 1 is a block diagram illustrating the hardware configuration of an image processing apparatus.

The configuration of an image processing apparatus in the first exemplary embodiment will be described. FIG. 1 is a diagram illustrating an example of the image processing apparatus in the first exemplary embodiment. An image processing apparatus 100 includes a central processing unit (CPU) 101, a random access memory (RAM) 102, a read only memory (ROM) 103, a secondary storage apparatus 104, an input interface 105, an output interface 106, an imaging apparatus 111, and a graphics processing unit (GPU) 112. The above components of the image processing apparatus 100 are connected to one another via a system bus 107. The image processing apparatus 100 is connected to an external storage apparatus 108 and an operation unit 110 via the input interface 105. The image processing apparatus 100 is also connected to the external storage apparatus 108 and a display unit 109 via the output interface 106.

The CPU 101 runs programs stored in the ROM 103 using the RAM 102 as a work memory to perform centralized control of the above components of the image processing apparatus 100 via the system bus 107. Thus, various types of processing described below will be carried out. The GPU 112 performs calculations on data received from the CPU 101 and outputs the operation results to the CPU 101. The secondary storage apparatus 104 is a storage device that stores various types of data to be handled by the image processing apparatus 100, and is a hard disk drive (HDD) in the present exemplary embodiment. The CPU 101 writes data to and reads from the secondary storage apparatus 104 via the system bus 107. Besides the HDD, the secondary storage apparatus 104 may be any of various storage devices such as an optical disk drive or a flash memory.

The input interface 105 is a serial bus interface under Universal Serial Bus (USB) or IEEE1394. The image processing apparatus 100 inputs data and commands from external apparatuses via the input interface 105. In the present exemplary embodiment, the image processing apparatus 100 acquires data from the external storage apparatus 108 (for example, a storage medium such as a hard disk, a memory card, a Compact Flash (CF) card, a Secure Digital (SD) card, or a USB memory) via the input interface 105. In the present exemplary embodiment, the image processing apparatus 100 acquires user instructions input to the operation unit 110 via the input interface 105. The operation unit 110 is an input device such as a mouse or a keyboard for inputting user instructions.

The output interface 106 is, like the input interface 105, is a serial bus interface under USB or IEEE1394. The output interface 106 may be a video output terminal under Digital Visual Interface (DVI) or High-Definition Multimedia Interface (HDMI®). The image processing apparatus 100 outputs data to external apparatuses via the output interface 106.

In the present exemplary embodiment, the image processing apparatus 100 outputs data processed by the CPU 101 (for example, image data) to the display unit 109 (various image display devices such as a liquid crystal display) via the output interface 106. The image processing apparatus 100 includes components other than those described above, but these components are not focused on in the present disclosure and thus description thereof will be omitted.

The imaging apparatus 111 captures input images to be processed by the image processing apparatus 100.

In the present exemplary embodiment, in the image processing apparatus 100 configured as described above, a mode will be described of inputting Bayer data to an image processing application and outputting demosaicked image data based on instructions from the CPU 101.

About CNN

First, the convolutional neural network (CNN) used generally in image processing technologies based on deep learning techniques, including the technique discussed in the non-patent document, will be described. The CNN is a learning-type image processing technique of repeatedly convolving filters generated by training into images and performing non-linear operation on the images. The filters are also called local receptive fields (LRFs). The images obtained by convolving filters and performing non-linear operation are called feature maps. Training is performed using training data (training images) formed of pairs of input images and output images. In brief, training is to generate, from training data, values of filters that make it possible to convert input images to output images with high accuracy. The details of the training will be described below.

If an image has red/green/blue (RGB) color channels or if a feature map includes a plurality of images, the filters used for convolution also have a plurality of channels accordingly. That is, the convolutional filters are represented in a four-dimensional array of the number of channels in addition to horizontal and vertical sizes and the number of filters. The non-linear operation after the convolution of the filters into images (or feature maps) is expressed in units of layers. Examples include a feature map on an n-th layer and a filter on an n-th layer. The CNN involving repeating the filter convolution and the non-linear operation three times has a three-layer network structure, for example. That processing can be formulated as in the following equation (1):

$$X_n^{(l)} = G(\Sigma_{k=1}^K W_n^{(l)} * X_{n-1}^{(l)} + b_n^{(l)}) \qquad (1)$$

In the equation (1), Wn is a filter on the n-th layer, $b_n$ is a bias on the n-th layer, G is a non-linear operator, $X_n$ is a feature map on the n-th layer, * is a convolution operator. The superscript (l) on the right indicates the l-th filter or feature map. The filters and biases are generated by training described below and are collectively called network parameters. The non-linear operation is performed by using, for example, a sigmoid function or rectified linear unit (ReLU). The ReLU is given by the following equation (2):

$$G(X) = \begin{cases} X & \text{if } 0 \le X \\ O & \text{otherwise} \end{cases} \qquad (2)$$

That is, the non-linear operation is performed such that the negative component of input vector X are set to zero and the positive component of the same are used as they are.

Next, the CNN training will be described. The CNN training is generally performed by minimizing an objective function represented by the following equation (3) with respect to the training data including sets of input training images (student images) and corresponding output training images (training images):

$$L(\theta) = \frac{1}{n} \sum_{k=1}^n \|F(X_i; \theta) - Y_i\|_2^2 \qquad (3)$$

In the equation (3), L is a loss function that measures the error between the correct answer and its estimation; $Y_i$ is an i-th output training image; $X_i$ is an i-th input training image; F is a function collectively expressing the operations performed on each layer of the CNN; θ is a network parameter (filter and bias); and $\|Z\|_2$ is a L2 norm, and in brief, the square root of the sum of the squares of the components of vector Z.

Additionally, n is the number of all training data for use in training. Since the number of all training data is large in general, some of the training images are selected at random and used for training in accordance with Stochastic Gradient Descent (SGD). This reduces a computation load in training using a large number of training data. There are known various methods of minimization (optimization) of an objective function, such as momentum method, AdaGrad method, AdaDelta method, and Adam method. Adam method is implemented by the following equation (4):

$$g = \frac{\partial L}{\partial \theta_j^t}$$
$$m = \beta_1 m + (1 - \beta_1) g$$
$$v = \beta_2 v + (1 - \beta_2) g^2$$
$$\theta_i^{t+1} = \theta_i^t - \alpha \frac{\sqrt{1 - \beta_2^t}}{(1 - \beta_1)} \frac{m}{(\sqrt{v} + \epsilon)} \qquad (4)$$

In the equation (4), $\theta_i^t$ is an i-th network parameter at a t-th repetition; g is a gradient of the loss function L related to $\theta_i^t$; m and v are moment vectors; α is a base learning rate;

β1 and β2 are hyper parameters; and, ε is a small constant. Since there is no guideline for selecting an optimization method in training, basically any method may be used. However, it is also known that training time differs among those methods due to their different convergence characteristics.

As networks using CNNs, there are widely known ResNet in the field of image recognition and applied RED-Net in the field of super-resolution. In both of them, the CNN is multi-layered and subjected to filter convolution many times to enhance the precision of processing. For example, ResNet is characterized by a network structure provided with paths short-cutting the convolved layers, which results in a multi-layer network with as many as 152 layers, providing high-precision recognition close to the human recognition rate.

The reason why a multi-layered CNN achieves high-precision processing is that, simply speaking, a non-linear relationship between inputs and outputs can be expressed through repetition of non-linear operation many times.

Functional Configuration Example of Image Processing Apparatus

Figure 4A:
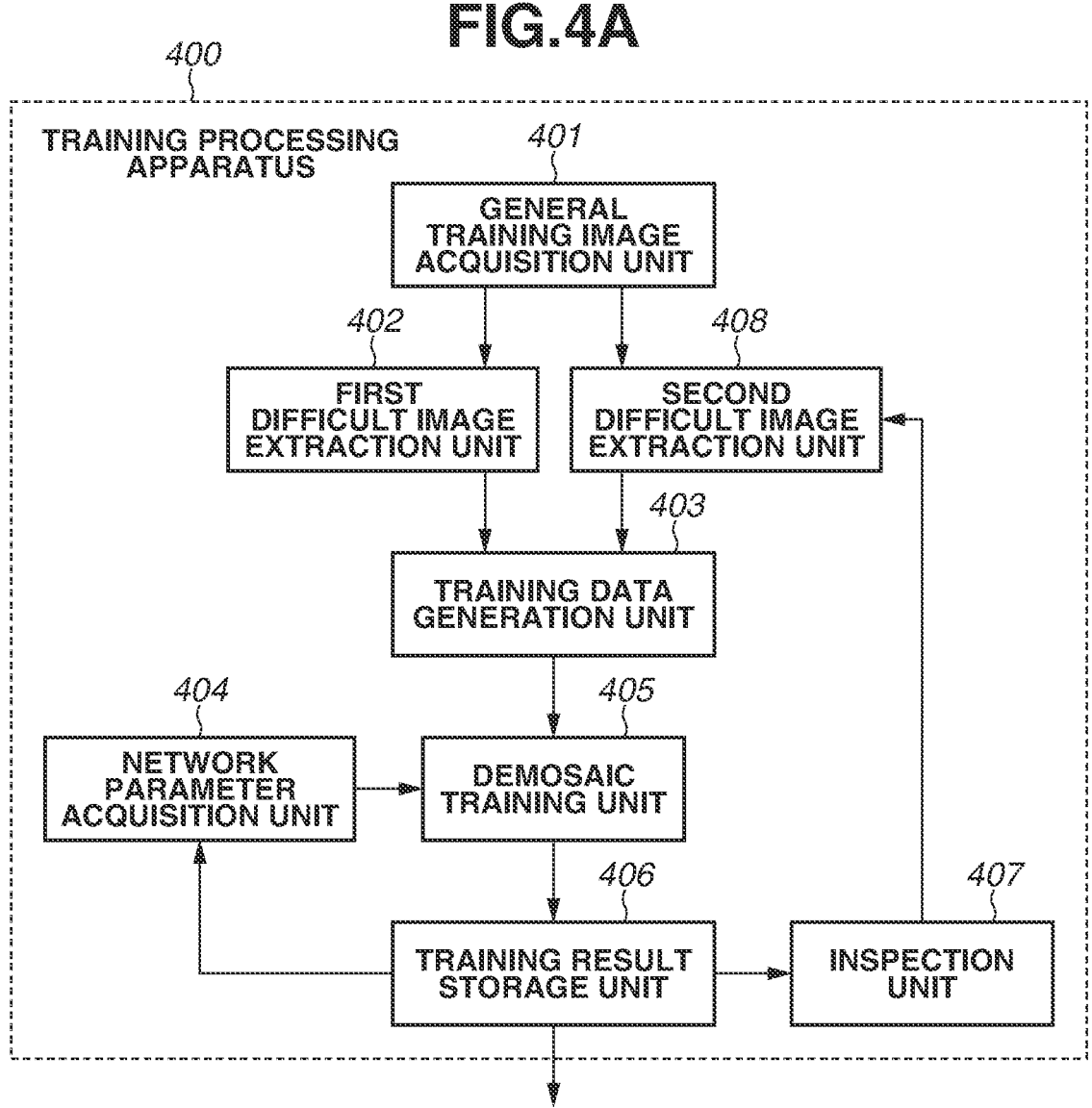
FIGS. 4A and 4B are block diagrams illustrating the configuration of an image processing apparatus according to one or more aspect of the present disclosure.
Figure 4B:
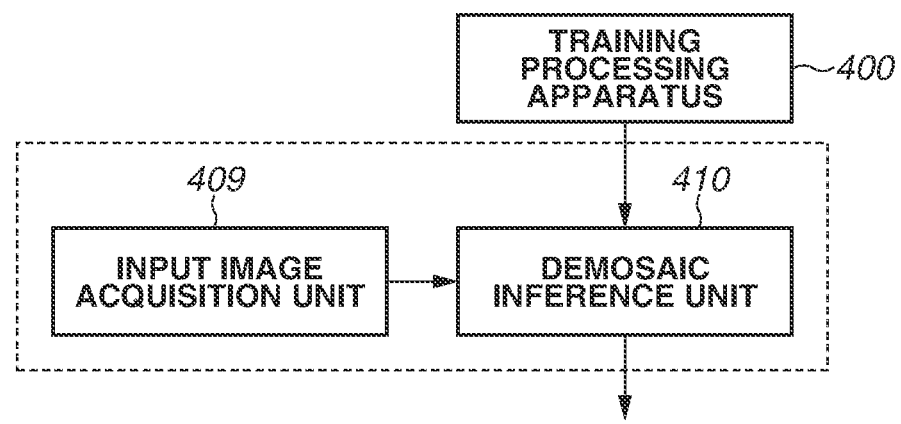

A functional configuration example of the image processing apparatus 100 according to the present exemplary embodiment will be described with reference to the block diagrams in FIGS. 4A and 4B and the flowchart of FIG. 5. The configuration illustrated in FIGS. 4A and 4B can be modified/changed as appropriate. For example, one functional unit may be divided into a plurality of functional units, or two or more functional units may be integrated into one functional unit. In addition, the configuration of FIGS. 4A and 4B may be composed of two or more apparatuses. In that case, the apparatuses are connected to each other via circuitry or a wired or wireless network to perform data communication for coordinated operations, thereby performing the processing described below as being performed by the image processing apparatus.

Hereinafter, the following includes a description of the functional units illustrated in FIGS. 4A and 4B to be mainly processed. In actuality, the functions of the functional units are performed by the CPU 101 running computer programs for the functional units. The functional units illustrated in FIGS. 2 and 3 may be implemented by hardware.

Figure 8:
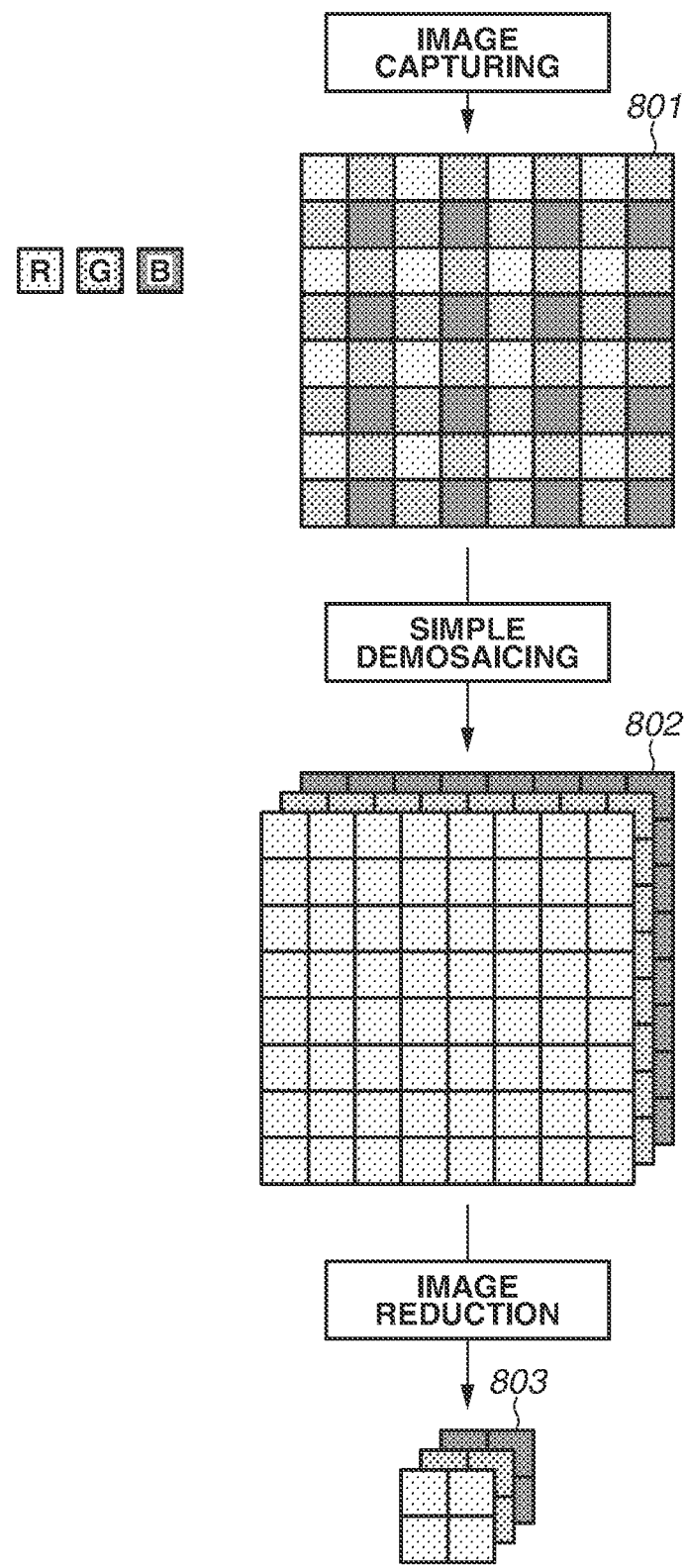
FIG. 8 is a diagram for describing a processing procedure at a training image generation unit according to one or more aspect of the present disclosure.

In step S501, a training image acquisition unit 401 acquires RGB training images. The training images are generated by the method described in the non-patent document. Specifically, as illustrated in FIG. 8, the imaging apparatus 111 acquires a mosaic image 801, applies simple demosaicking to the acquired mosaic image 801 to generate RGB images 802, and finally applies image reduction to the RGB images 802 to generate training images 803. As the simple demosaicking, bilinear interpolation is performed here, but another demosaicking technique may be used. As the color filter layout, a Bayer layout is illustrated here, but another color filter layout such as X-Trans may be used.

The training images are small images (patches) of a uniform size. If the training images are not of a uniform size or are too large to be input to the CNN, the training images are divided into patches.

The RGB training images may be acquired by a method other than that described in the non-patent document. For example, RGB training images may be obtained by reading images captured and stored in advance or by performing image capturing while shifting the position of the imaging element.

The acquired training images are output to a first difficult image extraction unit 402.

In step S502, the first difficult image extraction unit 402 extracts first difficult training images from the received training image group.

The extraction processing is performed by the technique described in the non-patent document. Specifically, after mosaicking of the general training images, a simple demosaicking technique is applied to the mosaic images, and errors between the demosaicked images and the original general training images are evaluated. If the evaluation value of any error is equal to or greater than a threshold t, the image is determined as a difficult training image. For the simple demosaicking described above, the results of bilinear interpolation or the results of subjecting the CNN in the non-patent document trained with general training images on a few epochs are used. The threshold may be set to t=−∞, where the general training image group and the difficult training image group coincide with each other.

For the evaluation values of the errors, High Dynamic Range Visual Difference Predictor (HDRVDP) that represents perceptual difference metric based on human visual characteristics and moire scores that represent evaluation values of spatial periodicity of errors are employed, based on the non-patent document. If any of the evaluation values exceeds the threshold t, the image is determined as a difficult training image. The obtained difficult training image group is output to a training data generation unit 403.

Figure 2:
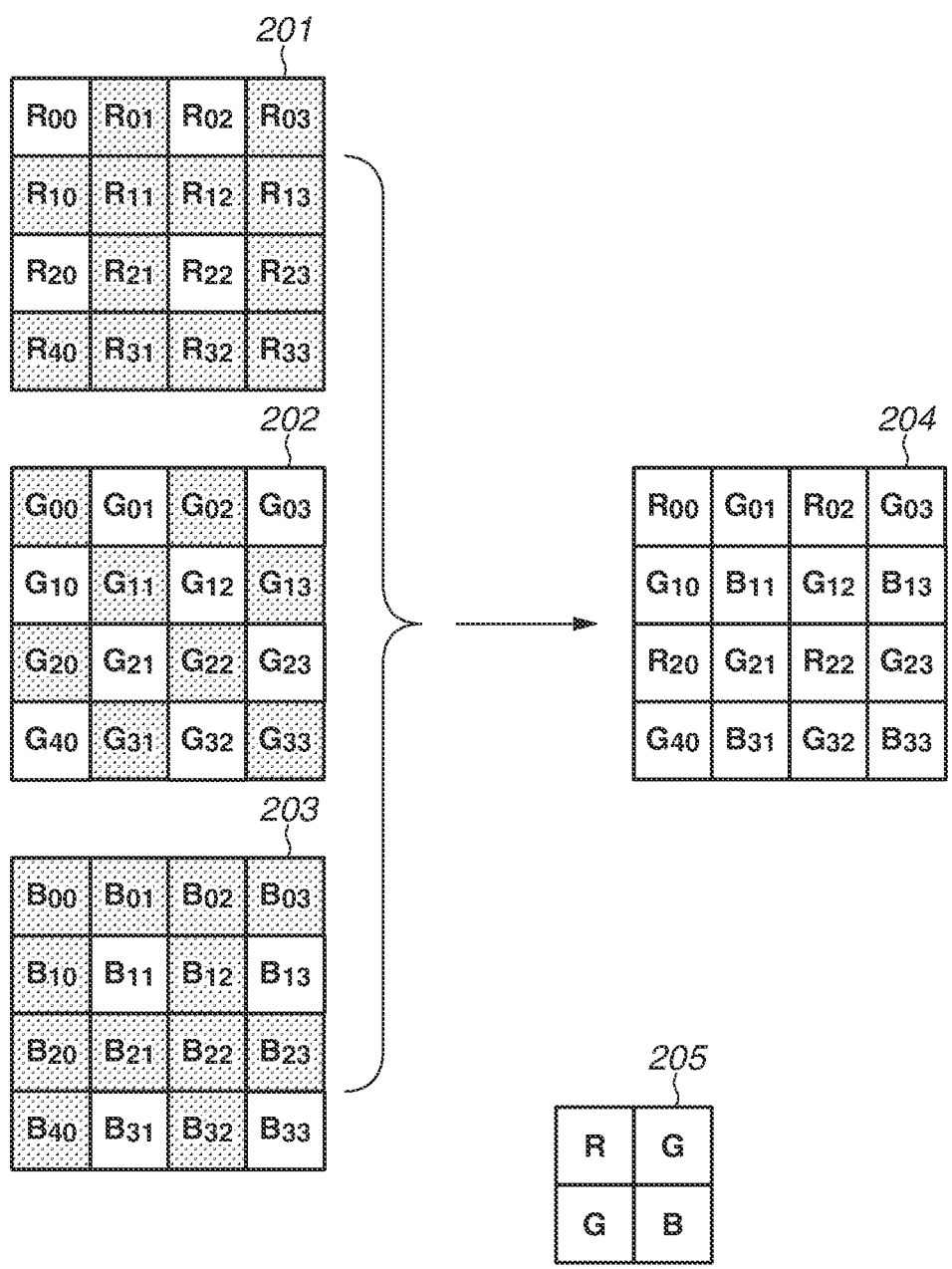
FIG. 2 is a diagram representing a procedure of generating a mosaic image based on color filter layouts of sensors.

In step S503, the training data generation unit 403 performs sub-sampling from the received difficult training image in accordance with a color filter layout pattern to generate a mosaic image (student image). The student image is formed through sub-sampling components from the difficult training image in accordance with the color filter layout pattern. Specifically, as illustrated in FIG. 2, the training data generation unit 403 performs sub-sampling components from R components 201, G components 202, and B components 203 in the difficult training image based on a color filter layout 205 to obtain a student image 204. The formed student image and the difficult training image are paired and output to a demosaic training unit 405.

In step S504, a network parameter acquisition unit 404 acquires CNN network parameters for use in demosaic training. The network parameter refers to a coefficient of each filter included in the CNN. The network parameter is set as a random number in accordance with normal distribution of He. The normal distribution of He refers to a normal distribution of which the average is zero and the variance is $\sigma_h$ as follows:

$$\sigma_h = \sqrt{\frac{2}{m_N}} \quad (5)$$

In the equation (5), $m_N$ is the number of neurons of the filter in the CNN. The network parameters may be determined by another method. The acquired network parameters are output to the demosaic training unit 405.

Figure 3:
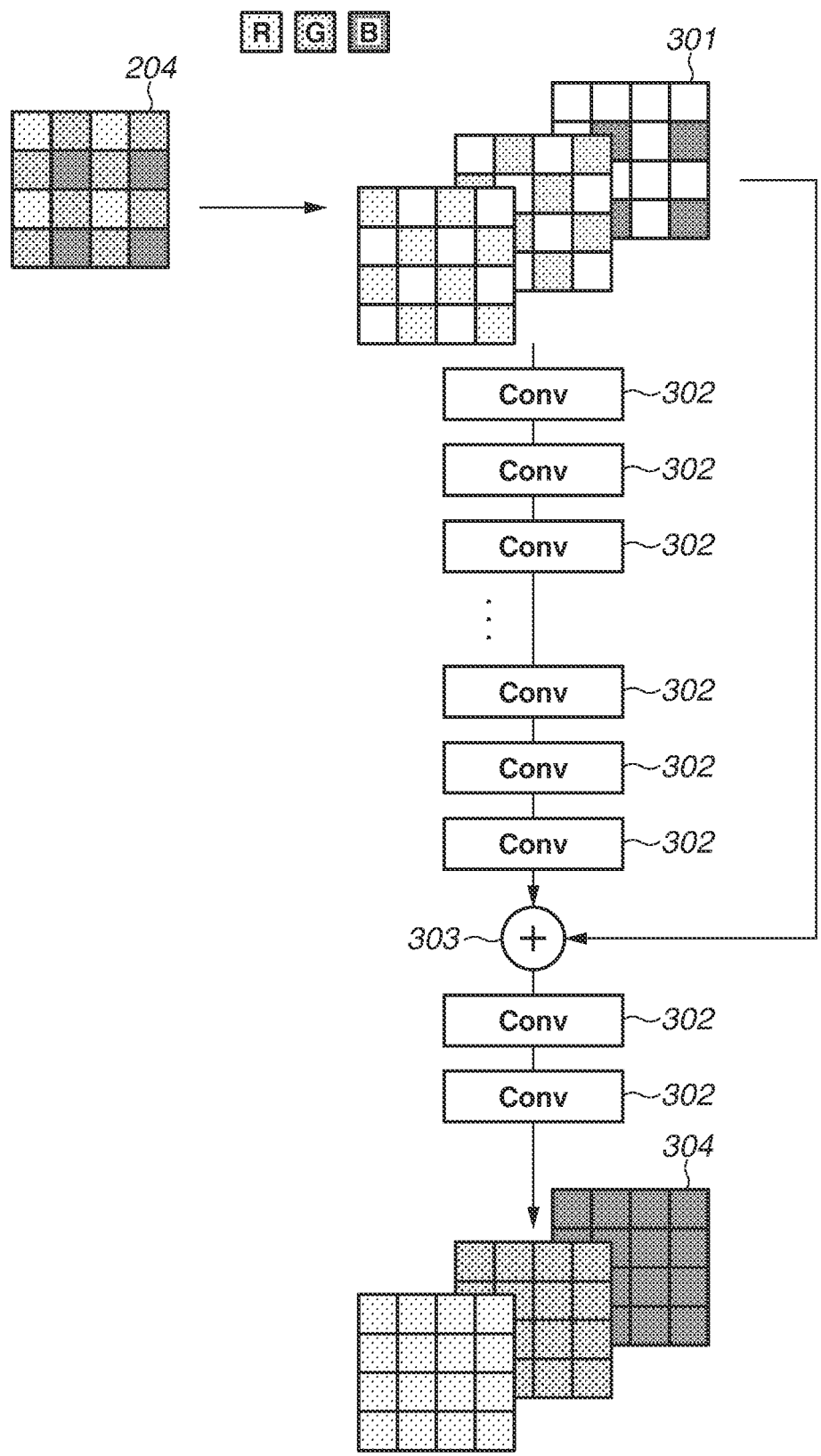
FIG. 3 is a diagram for describing a processing procedure in a demosaic (processing) network in the non-patent document.

In step S505, the demosaic training unit 405 initializes the weight on the CNN by the received network parameters, and then trains the CNN using the received image pairs. The CNN disclosed in the non-patent document is subjected to this training. FIG. 3 illustrates the structure of the CNN and a procedure of the training.

The CNN includes a plurality of filters 302 that performs the operation in the equation (1). At the input of the student image 204 to the CNN, the student image 204 is converted to deficient images 301 of three channels. The R channel of the deficient image contains R-component pixels alone of the student image, the values of the other pixels are set to a deficient value (zero). For the G channel and the B channel, similarly, their respective G- and B-pixel values alone are recorded and the values of the remaining pixels are zero. The deficient values may be interpolated by a technique such as bilinear interpolation. Then, the filters 302 are applied in sequence to the deficient images to calculate a feature map. Then, a connection layer 303 connects the calculated feature map and the deficient images 301 in the channel directions. If the numbers of channels in the feature map and in the deficient image are $n_1$ and $n_2$, respectively, the number of channels in the connection result is $(n_1+n_2)$. Subsequently, the filters are applied to the connection result, and an output of the three channels is produced by the final filter to obtain an inference 304.

The residual error between the obtained inference and the difficult training image is calculated and averaged in all the images to calculate a loss function value. The network parameters are updated by Back propagation based on the calculated loss function value. The above is a procedure of the training.

That training is performed on all the image pairs. If the image pair group includes a large number of image pairs, the image pair group is divided into batches of a certain number of pairs, and the training is performed in units of batches. The period for the learning to complete once on all the image pairs is called one epoch. After the end of one-epoch training, the next-epoch learning is performed (the learning is performed one more time on all the image pairs). This process is repeated until a given number of epochs is reached to update the network parameters, and the update results are output to a training result storage unit 406 and an inspection unit 407.

In step S506, the training result storage unit 406 stores the received network parameters.

In step S507, the inspection unit 407 determines whether the training has completed. For the determination, mosaic images (hereinafter, called test charts) including areas where image quality defects such as high-frequency parts or saturated parts are likely to occur are prepared in an image data group of scenery photographs or person photographs that have not been used for the learning. The test charts are demosaicked using the trained CNN to evaluate an error ε in accordance with the following equation:

$$\varepsilon = \frac{1}{N}\sum_{i=1}^{m} g(F(X_i; \theta), Y_i) \quad (6)$$

In the equation (6), $X_i$ is an i-th chart image, $Y_i$ is its ground-truth image, and g(,) is a function of evaluating an error between two images. The index for error is 2 norm, but another index such as HDRVDP used in step S502 or moire score may be used as a quantitative evaluation value, or the minimum value or average value among a plurality of indexes may be used as the output of g( ). If the calculated error ε is smaller than a given threshold, the inspection unit 407 determines that the training has completed (YES in step S507). At the selection of the test chart, the error ε may be calculated in accordance with the equation (6) from a plurality of candidate images, and a candidate image with a large error ε may be determined as the test chart.

The determination criterion for completion of the training is not limited to that. For example, the determination criterion may be whether the amount of change in the network parameter at the time of updating is smaller than a prescribed value or whether the residual difference between the inference and the training image are smaller than a prescribed value. In addition, if the number of repetitions of the training (updates of the network parameters) has reached a prescribed value, the inspection unit 407 may determine that the training has completed. If the training has not completed (NO in step S507), the processing proceeds to step S508.

In step S508, a second difficult image extraction unit 408 extracts second difficult training images from the general training image group, based on updated network parameters θ'. For the extraction, an evaluation function g is applied to the i-th general training image $Y_i$ and its mosaicked image $X_i$ to calculate an error $\varepsilon_i$ as follows:

$$\varepsilon_i = g(F(X_i; \theta'), Y_i) \quad (7)$$

The images with errors equal to or greater than a given threshold are determined as second difficult training images.

The method of extraction of the second difficult training images is not limited to that method. For example, the error values calculated at the extraction of the first difficult training images in step S502 may be stored in advance, a threshold t' greater than the threshold t used in step S502 may be set, and the images with error values exceeding the threshold t' may be determined as the second difficult training images. That saves the cost of newly calculating the error values.

The extracted second difficult training image group is used to perform again the training processing in steps S503 to 507 (re-training). The network parameter acquisition unit 404 acquires random initial values in accordance with the equation (5), and the demosaic training unit 405 starts the training with the random initial values. The network parameters θ' obtained at the first training may be read from the training result storage unit 406 and used as the initial values to continue the training.

The inspection unit 407 inspects the network parameters as the re-training results, and makes a determination on the completion of the training as in step S507. If the training has not completed (NO in step S507), the processing returns to step S508. In step S508, the re-training is performed again. If the training has completed (YES in step S507), the updated network parameters stored in the training result storage unit 406 are set as final training results.

As described above, the demosaic training process is performed. To perform the inference of demosaicking using the training results, the processing proceeds to the next and subsequent steps. In that case, the training result storage unit 406 outputs the network parameters to a demosaic inference unit 410.

In step S509, an input image acquisition unit 409 captures a mosaic image (input image) to be demosaicked, with the imaging apparatus 111. As the input image, an image that has been captured and stored in advance may be read. The acquired input image is output to the demosaic inference unit 410.

In step S510, the demosaic inference unit 410 establishes the same CNN as that used in the training by the demosaic training unit 405. The demosaic inference unit 410 initializes the network parameters with the network parameters received from the training result storage unit 406. The demosaic inference unit 410 inputs the received input image to the CNN and obtains the inference by the same method as that used by the demosaic training unit 405.

According to the present exemplary embodiment, the above described configuration allows update of network parameters while reducing image quality defects.

Figure 6:
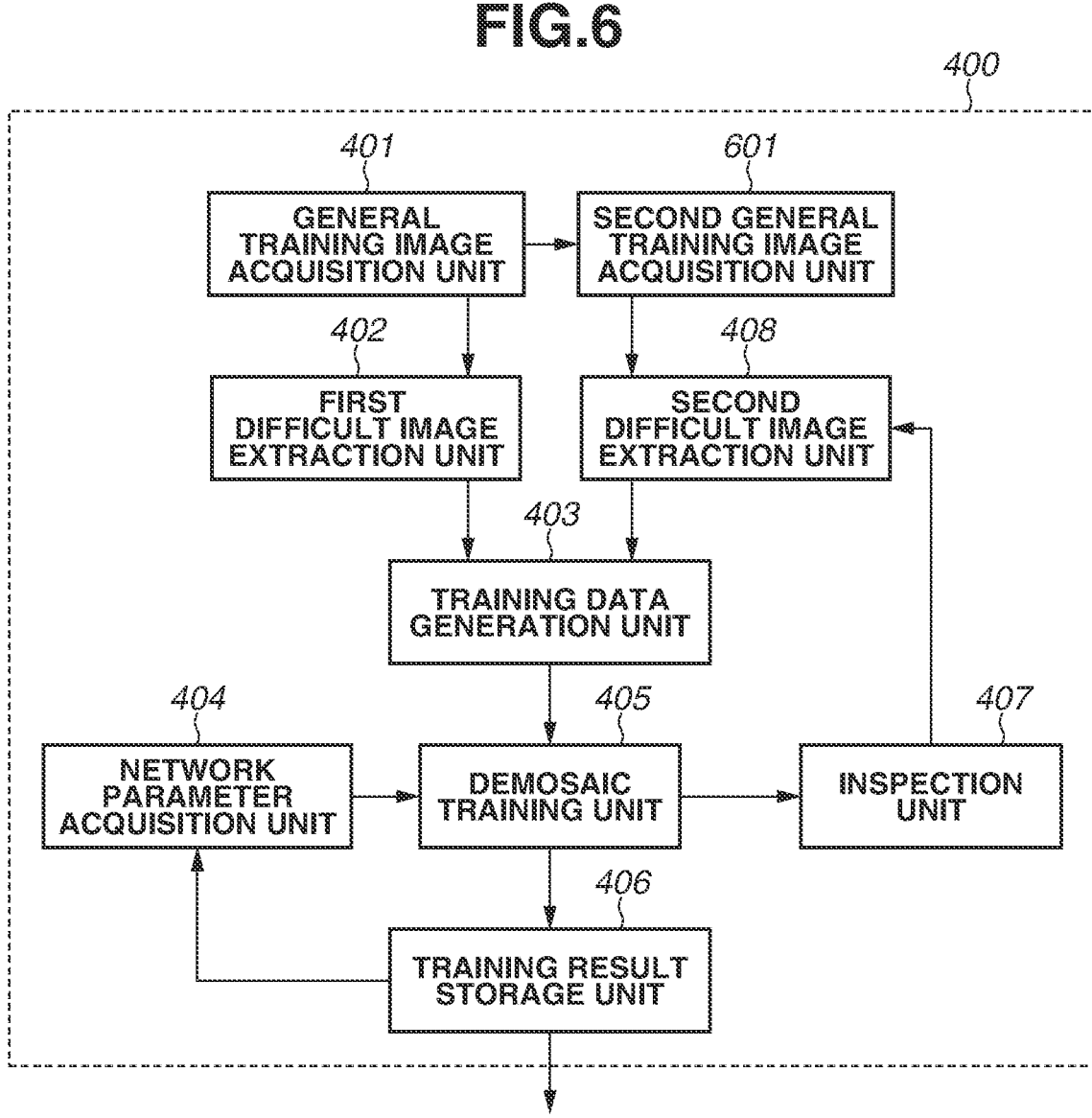
FIG. 6 is a block diagram illustrating the configuration of an image processing apparatus according to one or more aspect of the present disclosure.
Figure 7:
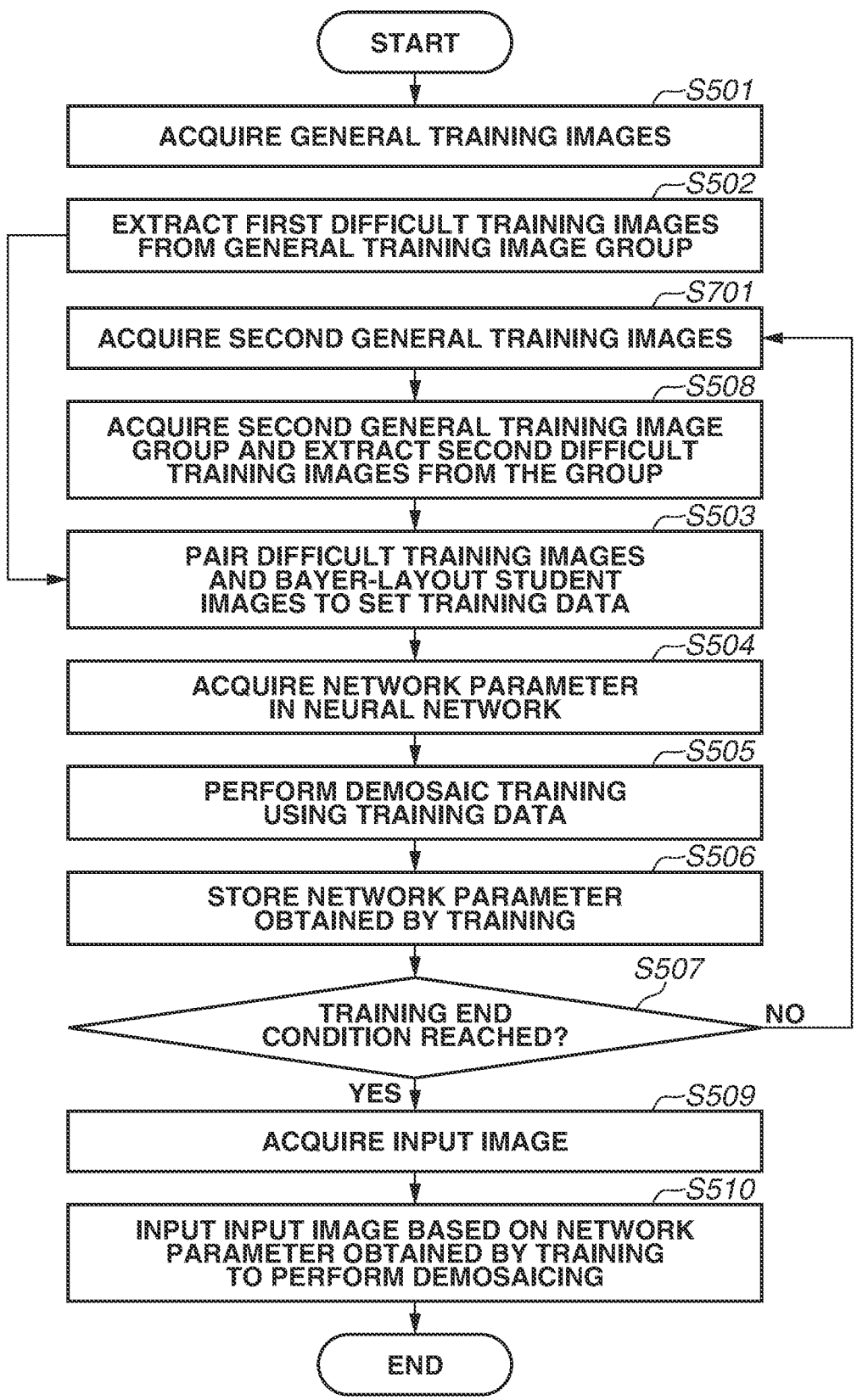
FIG. 7 is a flowchart illustrating image conversion processing according to one or more aspect of the present disclosure.
Figure 9B:
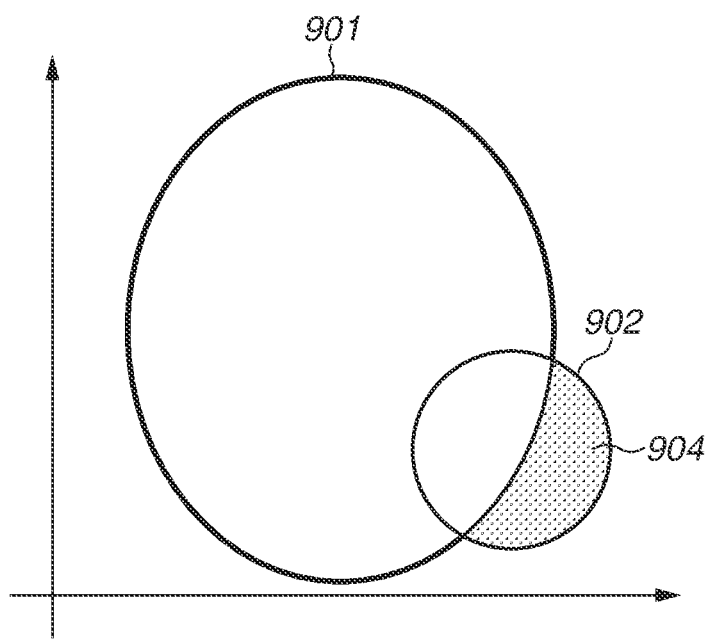

A second exemplary embodiment will be described. In the first exemplary embodiment described above, as an example, the second difficult training images are extracted from the first general training images that constitutes the population from which the first difficult training images are extracted. However, as illustrated in FIG. 9B, the insufficiently trained area 904 may be present outside the area of the general training image 901 covered with the general training image group. Such a case involves acquiring a second general training image group to cover the area of the general training image 901. In the second exemplary embodiment, as an example, a second general training image group different from first general training images is prepared, and second difficult training images are extracted from the second general training image group. The procedure of training in the present exemplary embodiment will be described with reference to the block diagram in FIG. 6 and the flowchart in FIG. 7.

In step S701, a second general training image acquisition unit 601 acquires RGB second general training images based on the first general training images generated in step S501.

The second general training image group desirably includes images with characteristics different from those of the first general training images. Thus, the second general training images are generated by subjecting the first general training images to color phase conversion/brightness conversion. In order to perform these conversions, white balance change is applied to the first general training images, and the obtained images are set as the second general training images. The white balance change is performed such that, for the red (R) channel, for example, a pixel value R is multiplied by a coefficient $w_R$ to obtain a change result R'. The same applies to the green and blue channels.

$$R' = w_R R \quad (8)$$

As the method of determining the white balance coefficient, a plurality of candidates for a set of three-color coefficients ($w_R$, $w_G$, and $w_B$) is prepared and a suitable set is selected from among the candidates. At the selection, a test chart or a training image $Y_i$ to which the white balance is applied and its mosaicked image $X_i$ are prepared, and the magnitudes of errors resulting from the demosaicking of the mosaic image are evaluated in accordance with the equation (6).

Then, the candidate with the largest error is selected and applied to the second general training images to obtain the second difficult training images. The demosaic training is performed using the obtained second difficult training image group so that the images with insufficiently trained color phases can be intensively trained, thereby reducing the generation of image quality defects.

The white balance coefficient may be determined by superimposing a random number on the selected one described above, or may be selected at random from among candidates, or a different white balance coefficient may be applied to each image. The thus obtained conversion results and one or more of the first difficult training images may be mixed to generate the second difficult training image group.

The conversion applied to the first general training images is not limited to the white balance change. For example, gains may be applied to the images or contrast stretch may be performed on the images. In addition, general image conversion such as color phase shift in a hue/saturation/value (HSV) color space may be used.

While the second general training images are obtained by converting the first general training images, the second general training images may be newly acquired by a method similar to that in step S501. For example, the imaging apparatus 111 may capture new images or images may be acquired from the web or a database. Besides, the second general training images may be prepared through computer graphics (CG) or image generation. In that case, the images of insufficiently trained areas are produced on a priority basis.

According to the present exemplary embodiment, the above-described configuration allows update of the network parameters while further reducing image quality defects.

The present disclosure is devised in view of the above-described issue and provides a technique for outputting more suitable demosaic images.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-053212, filed Mar. 26, 2021, which is hereby incorporated by reference herein in its entirety.

What is claimed is:

1. An image processing apparatus comprising:
 an acquisition unit configured to acquire training image data;
 a first extraction unit configured to learn the training image data;
 a determination unit configured to determine, based on the learning of the training image data, the difficult training image data and extract a first difficult image data that is difficult to learn;
 a generation unit configured to generate student image data by mosaicking the first difficult image data;
 a training unit configured to generate a network parameter obtained by re-learning a pair of the first difficult image data and the student image data; and
 a second extracting unit configured to extract second difficult image data different from the first difficult image data based on an error evaluation value between a ground-truth image in the training image data and a demosaicked image generated by using the network parameter,
 wherein the training unit repeats the re-learning by generating a plurality of times the second difficult image data.

2. The image processing apparatus according to claim 1, further comprising an inspection unit configured to inspect the network parameter and determine whether to perform the re-learning or generate a final network parameter,
 wherein the inspection unit performs the determination based on the number of times the network parameter has been updated.

3. The image processing apparatus according to claim 2, wherein the inspection unit calculates a quantitative evaluation value that indicates a magnitude of a perceptual difference between the training image data and a result obtained by subjecting mosaicked image data of the training image data to demosaic processing with the network parameter, and in response to a determination based on the quantitative evaluation value that the perceptual difference is large, the re-learning is performed.

4. The image processing apparatus according to claim 3, wherein the training unit determines a white balance coefficient to be applied in generating data that has been changed in white balance of the training image data, as the second training data, based on the quantitative evaluation value.

5. The image processing apparatus according to claim 1, wherein the second extraction unit extracts data with a large perceptual difference between the training image data and a result obtained by subjecting mosaicked image data of the training image data to demosaic processing by a demosaic processing network.

6. The image processing apparatus according to claim 1, wherein the training unit acquires second training data obtained by updating the training image data and generates the second difficult image data from the second training data.

7. The image processing apparatus according to claim 6, wherein the second training data includes at least the training image data.

8. The image processing apparatus according to claim 7, wherein the training unit generates data that has been changed in white balance of the training image data, as the second training data.

9. The image processing apparatus according to claim 6, wherein the training unit generates data that has been changed in at least one of brightness, hue, or saturation of the training image data, as the second training data.

10. The image processing apparatus according to claim 6, wherein the training unit generates data that has been changed in white balance of the training image data, as the second training data.

11. The image processing apparatus according to claim 1, wherein the training unit performs the re-learning with a weight on the network parameter as an initial value.

12. The image processing apparatus according to claim 1, wherein the error evaluation value of the second difficult image data is larger than the error evaluation value of the first difficult image data.

13. The image processing apparatus according to claim 1, wherein the second difficult image data do not include the first difficult image data of which the error evaluation value is smaller than a threshold.

14. An image processing method comprising:
acquiring training image data;
learning the training image data;
determine, based on the learning of the training image data, the difficult training image data and extracting a first difficult image data that is difficult to learn;
generating student image data by mosaicking the first difficult image data; and
training by generating a network parameter obtained by re-learning a pair of the first difficult image data and the student image data; and
a second extracting second difficult image data different from the first difficult image data based on an error evaluation value between a ground-truth image in the training image data and a demosaicked image generated by using the network parameter,
wherein in the training, the re-learning is repeated by generating a plurality of times the second difficult image data.

15. A non-transitory computer-readable storage medium storing a program for causing a computer to execute an image processing apparatus method; the method comprising:
acquiring training image data;
learning the training image data;
determine, based on the learning of the training image data, the difficult training image data and extracting a first difficult image data that is difficult to learn;
generating student image data by mosaicking the first difficult image data; and
training by generating a network parameter obtained by re-learning a pair of the first difficult image data and the student image data; and
a second extracting unit configured to extract second difficult image data different from the first difficult image data based on an error evaluation value between a ground-truth image in the training image data and a demosaicked image generated by using the network parameter,
wherein in the training, the re-learning is repeated by generating a plurality of times the second difficult image data.

\* \* \* \* \*